Nov. 10, 1964 N. J. ROSEN ETAL 3,156,793
CONTACT ELEMENTS FOR PERFORATED RECORD READING DEVICES
Filed May 24, 1962 7 Sheets-Sheet 1

INVENTORS.
NORMAN J. ROSEN
ROBERT H. LEWIS
HOWARD C. STANLEY
BY
Christie, Parker & Hale
ATTORNEYS.

INVENTORS.
NORMAN J. ROSEN
ROBERT H. LEWIS
HOWARD C. STANLEY
BY
Christie, Parker & Hale
ATTORNEYS.

United States Patent Office 3,156,793
Patented Nov. 10, 1964

3,156,793
CONTACT ELEMENTS FOR PERFORATED
RECORD READING DEVICES
Norman J. Rosen, Altadena, Robert H. Lewis, West Covina, and Howard C. Stanley, Glendora, Calif., assignors to Datex Corporation, Monrovia, Calif., a corporation of California
Filed May 24, 1962, Ser. No. 197,533
10 Claims. (Cl. 200—46)

This invention relates to data processing systems and more particularly to readers for record members or cards having information recorded thereon in terms of perforations for providing electrical indications thereof to be used in a data processor.

This application is a continuation-in-part of our earlier filed application entitled Record Reader, filed on September 1, 1960, bearing Serial No. 53,538, and assigned to the same assignee as the present application and now abandoned.

Data processing systems utilizing information derived from perforated record members or cards have been devised for many applications. In general, the perforated record cards have been read or processed in large volumes at high speeds. The advantages of the punched record and card data processing system have made it desirable to use the perforated record member for monitoring production lines in industrial processing systems and the like. The monitoring of manufacture in this fashion would be provided by an operator transmitting information representative of the status or the condition of the manufacture at preselected stations and at preselected intervals whereby the information transmitted by any one operator or operators are all received by a central data processor. The data processor, in turn, operates on the information to give the desired over-all indication of the manufacture and allow any changes that may be needed to be transmitted to the operator. This type of monitoring operation has led to a demand for an inexpensive punched record reader, preferably portable, that may be utilized in a plurality of remote locations for such monitoring purposes.

This invention provides an improved, compact, more reliable and inherently less expensive record reader than was heretofore possible. The record reader utilizes a novel sensing construction whereby no electrical contacts are provided through the record member itself. This purely mechanical sensing arrangement prevents the contamination of the electrical sensing contacts with foreign substances introduced into the reader by means of the record members and thereby results in substantially trouble-free operation. The reader is further constructed and defined whereby the electrical portions thereof are not exposed to the operator and thereby are not subject to tampering. The sensing construction of the record reader allows an appreciable reduction in the number of sensing elements and conductive buses for reading a record member in comparison with similar devices heretofore proposed. This reduction in parts not only results in an inexpensive but also an easily maintained and serviced reader.

In one embodiment of the invention the reader is arranged for reading record members or cards arranged with a preselected number of rows or columns for recording information in terms of perforations in a particular row and column. This embodiment of the reader includes a record member or card receiving tray mounted for sliding movement into and out of a reading position. The slidable tray is merely exposed an amount to receive the record member, while the remainder of the reader is completely housed. The record card receiving tray is provided with a plurality of row grooves corresponding to the number of rows on the record member to be read and which grooves are spaced apart a distance corresponding to the spacing of the rows on the record member. The receiving tray is further defined with a plurality of spaced conductor bars corresponding to the plurality of rows on the record member and which row conductor bars are insulatively spaced apart and also correspond to the spacing between the grooves or the rows on the record member. The row conductor bars may be advantageously constructed and defined by means of printed circuit techniques whereby a smooth surface is provided for the tray. The record member is received on the tray at the grooved portion thereof whereby the rows of the record member overlie the row groves, row by row. A plurality of electrically conductive column bars are supported in a spaced relationship and arranged transversely to the row conductor bars and which column bars correspond to the number of columns on the record member to be read or the total columnar capacity of the reader. The column conductor bars are insulatively spaced apart and provided with insulative guides for receiving a slidable sensing element. A slidable sensing element is provided for each column bar and is secured in a non-reading position between the guides to slide along the column bars. The sensing element supporting member is arranged to maintain the sensing elements in a releasable, non-reading position when the tray is, in turn, in a non-reading position. Each of the sensing elements is advantageously constructed by means of a pair of conducting elements, each end of which is provided with a sensing finger to engage a recorded perforation, while the associated sensing finger on each conducting element is spaced therefrom to engage a row conductor bar and thereby provide an electrical connection to the individual column bus indicative of the sensed perforation when the tray is in a reading position.

The reliable operation of the reader of this invention results from the provision of the improved sensing element utilized therein. The sensing element in one embodiment comprises a pair of elongated electrical conducting elements defined with protruding sensing fingers at opposite ends thereof for engaging a perforation or a conductor bar. The pair of conducting elements are secured together at a central point in a loose relationship to allow their sensing fingers to be spaced apart a preselected distance. The spacing of the sensing fingers is related to the width of the recording channel or columns on the record member whereby a perforation in a column that is displaced in the direction of a row may be sensed by either sensing finger separately and whereby each sensing finger will separately provide the required electrical current. The central securing member is similarly defined with a pair of sensing fingers protruding in the opposite direction from the mentioned sensing fingers for engaging and sliding along the column buses. These sensing elements are constructed of a material of sufficient resilience to be held under tension and yet of sufficient stiffness to be slidable while in tension, in response to the engagement of a sensing finger with a row groove during the relative movement between the tray and the sensing element mounting means.

These and other features of the present invention may be more fully appreciated when considered in the light of the following specification and drawings, in which.

Figures 1, 2:
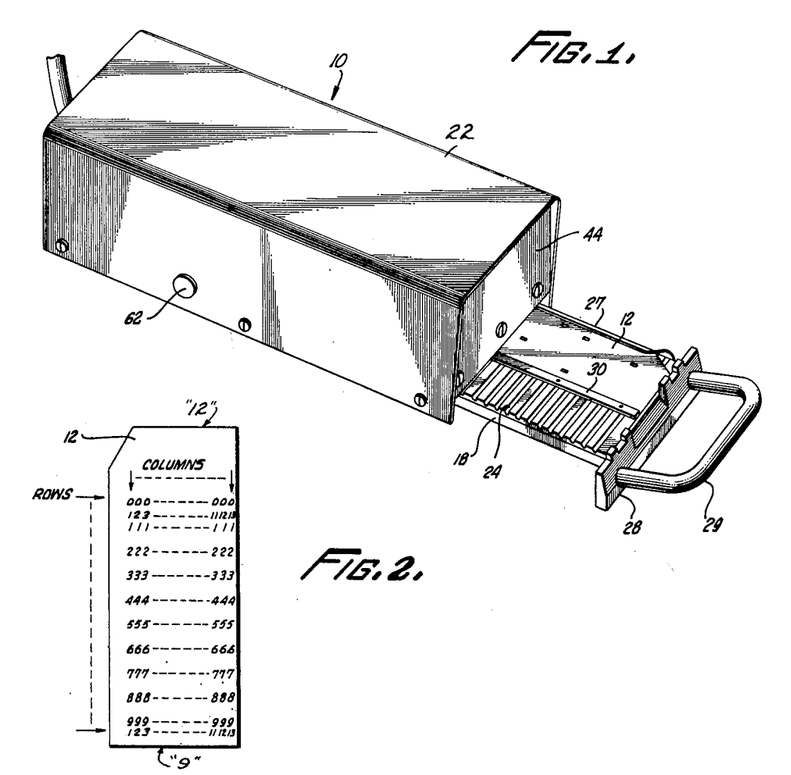
FIGURE 1 is a perspective view of the reader showing a record member in position to be read embodying the invention.
FIGURE 2 is a representation of a typical record member for use with the reader of FIG. 1.

The reader 10 is particularly adapted to read a record member arranged with a preselected number of rows and columns and having coded information recorded thereon in terms of perforations in a particular row and column. A typical record member for the purposes of this invention is shown in FIG. 2 and will be recognized as similar to the standard "IBM" punch card. The record member 12 is arranged with columns extending lengthwise, and the rows are arranged transversely thereto to subdivide the width of the card into approximately twelve rows. This type of record member varies in length in accordance with the required number of columns to be read and may range up to eighty columns in length. The record member 12 is shown with thirteen columns and twelve rows and the reader 10 is adapted for reading record members up to thirty columns and twelve rows.

The reader 10 comprises a supporting member 14 mounting a plurality of perforation sensing elements 16 coacting with a slidable record member receiving tray 18. The supporting member 14 and the tray 18 are arranged on a base 20 and are completely enclosed by means of a U-shaped housing 22. The housing 22 is secured to the base 20 by means of screws or the like to completely enclose the reader 10 when the tray 18 is in a reading position. The only portion of the reader 10 that is exposed to the operator is the portion of the tray 18 receiving the record member 12, as shown in FIG. 1.

The record member receiving tray 18 is constructed of an electrically insulative material and the front end or exposed end is provided with a plurality of transversely aligned grooves, similar to the groove 24, extending the full width of the tray, the number of grooves 24 corresponds to the number of rows on the record member to be sensed. In this instance twelve grooves are shown for sensing each of the twelve rows on the record member 12. An additional groove 26 is arranged adjacent the innermost row groove 24 for detecting the absence of a record card on the tray 18 or the presence of a record card thereon having less than the preselected number of rows, as will be explained more fully hereinafter. The tray 18 is provided with card guides or card retaining elements 27 arranged on opposite sides of the tray 18 and extend from a front wall or plate 28 to the end of the groove 26 to slidably receive a record member. A raised shoulder 29a is provided adjacent the inner side of the groove 26 and inside the housing 22 to define a stop for positioning the record member 12. A similar shoulder is provided adjacent the rear edge of the front plate 28 of the tray (not shown). Both of these raised edges or shoulders have a very light clearance to the front plate 28 to prevent the closing of the tray 18 if the record member 12 is displaced so as to rest on these shoulders.

The front wall 28 is provided with a handle 29 secured thereto for positioning the tray 18 into and out of a reading position within the reader 10. The tray 18 is also provided with a barrier 30 that may be mounted intermediate the card guides 27 to accommodate record members, such as the member 12, having less than the preselected thirty columns. The barrier 30 is removably mounted over the row grooves 24 and, in this fashion, will not only accommodate record members of varying column length but may also be arranged to accommodate two or more record members having a total number of columns within the capacity of the columnar width of the tray 18.

A plurality of row conductor bars 32 are also arranged on the tray 18 in a longitudinally spaced relationship relative to the row grooves 24. The row conductor bars 32 correspond in number to the plurality of rows on the record member to be read and thereby correspond to the number of row grooves 24 on the front portion or exposed portion of the tray 18. The row conductor bars 32 are spaced apart a distance substantially equivalent to the spacing of the rows on the record member 12 and are mounted to be exposed and flush with the top surface of the tray 18. The row conductor bars 32 may be constructed and defined in this fashion by means of printed circuit techniques. In addition to the twelve row conductor bars 32, an additional conductor bar 33 may be provided adjacent the outermost conductor bar 32, or the conductor bar 32 corresponding to row twelve of the record member 12. The conductor bar 33 may be utilized for detecting blank columns on the record member 12, as will be described more fully hereinafter. It should, therefore, now be apparent that the top surface of the tray 18 is a substantially smooth surface from end to end with the exception of the provision of the row grooves 24 and is insulated throughout whereby the row conductor bars 32 are electrically isolated from the other portions of the reader 10.

Figure 8:
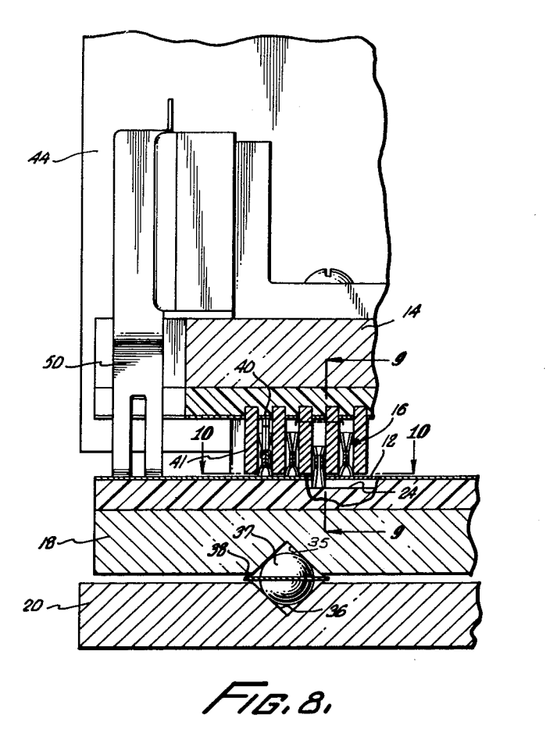
FIGURE 8 is a partial sectional view, with portions broken away, and portions in elevation taken along the line 8—8 of FIG. 3.

The bottom surface of the tray 18 is provided with a pair of V-shaped grooves 35 extending longitudinally thereof and coacting with similar V-shaped grooves 36 provided for the insulative base member or plate 20; see FIG. 8. The V-shaped grooves 35 and 36 accommodate ball bearings 37 retained in cage assemblies 38. Three ball bearings 37 retained in a single cage 38 are shown. This arrangement allows the tray 18 to ride on the ball bearings and to slide lengthwise relative to the base plate 20.

The smooth, top surface of the tray 18 allows the sensing elements 16 carried by the supporting member 14 to smoothly slide thereover and when the record member 12 is arranged on the tray 18 to connect a sensed row conductor bar 32 into electrical engagement with a corresponding column conductor bar individual to that sensing element to provide an electrical indication that a perforation is recorded on the record member 12 in a particular row and column.

Figures 5, 6:
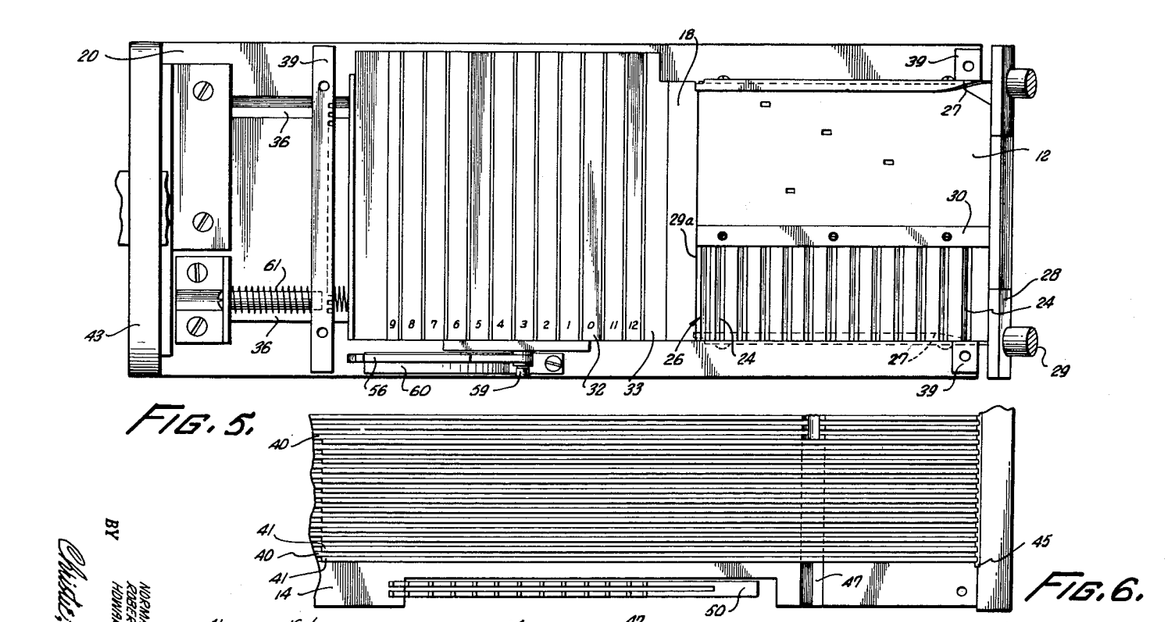
FIGURE 5 is a top plan view of the record member receiving tray shown in a reading position with the record member thereon and the housing and supporting member removed.
FIGURE 6 is a partial, bottom plan view of the supporting member showing the column conductor buses.

The supporting member 14 is mounted on the base member 20 in a stationary position and in a predetermined spaced relationship with respect to the tray 18 by means of the spacer bars 39 secured to the base 20. This construction allows the tray 18 to slide into and out of reading position with respect to the sensing elements 16 carried by the supporting member 14. One face of the supporting member 14 is arranged with a plurality of longitudinally extending column buses 40. The number of column buses 40 preferably correspond to the width of the tray 18 or the total columnar capacity of the tray. Each of the column buses 40 are arranged in an insulative, spaced-apart relationship corresponding to the spacing of the columns on the recording member 12, and also may be manufactured by means of printed circuit techniques. The column buses 40 are arranged on the lower portion of the supporting member 14 to face the top surface of the tray 18. Each of the column buses 40 that are to be utilized for sensing the thirteen columns of the record member 12 are provided with a pair of longitudinally extending, insulative guides 41 arranged on opposite sides and adjacent to these column buses 40. The column buses 40 may then be considered as an overhead track for the sensing elements 16 and are constructed and defined to guide and insulate the sensing elements 16 from the remaining sensing elements and column buses. The portion of the supporting member 14 shown in FIG. 6 is arranged with only thirteen of the column buses 40 provided with the guides 41 to correspond with the thirteen column record member 12. It will be apparent that the remaining column buses 40 may be similarly provided with guides 41 or some of the guides and/or sensing elements 16 removed when different sized record members are to be read.

Figure 1A:
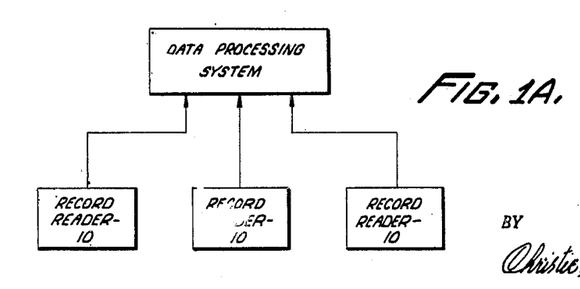
FIGURE 1a is a block diagram of a data processing arrangement showing the relationship with the reader of FIG. 1.

Each of the column buses 40 have their inner ends connected to a separate electrical terminal, similar to terminal 42, and which terminals are, in turn, each provided with a separate lead wire, connected and harnessed together to an electrical connector for use with a cable extending through the rear plate 43. The rear plate 43 is secured to the base 20 and acts as a closure for the rear of the U-shaped housing 22. The cable extends to the remotely located data processing system, see FIG. 1a. The outer ends of the column buses 40 extend to a front plate 44 which is secured to the supporting member 14 as by screws, and which front plate acts as a closure for the front of the U-shaped housing 22 in combination with the tray 18. The front plate 44 also mounts a conducting bus 45 along its lower edge and which bus is utilized for detecting blank columns on a record member to be read and for locating the sensing elements 16 in a non-read position, as will be more evident hereinafter. The conducting bus 45 extends longitudinally of the plate 44 and is defined with a plurality of notches or grooves for receiving the ends of the sensing element 16, the number of notches corresponding to the number of column conducting buses 40. The supporting member 14 is also provided with an insulative V-shaped groove 47 spaced inwardly from the front plate 44 a preselected distance. The V-shaped groove 47 runs transversely across the supporting member 14 and produces a discontinuity in the portions of the column buses 40 arranged on opposite sides thereof. The groove 47 is utilized to releasably secure the sensing elements 16. The sensing elements 16 are retained in a non-read position by means of the groove 47 and the groove and sensing element are defined relative to one another to allow the sensing elements to be released therefrom upon the production of relative movement between the tray 18 and the supporting member 14.

Figure 3:
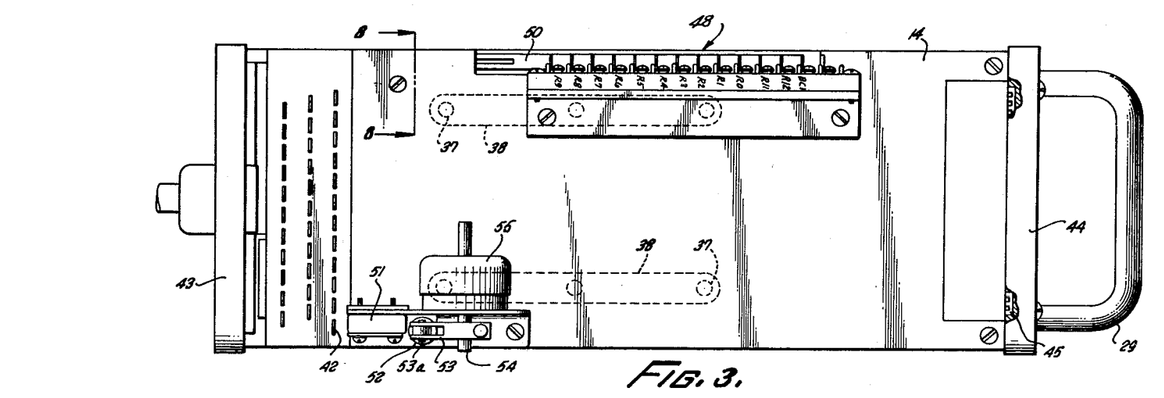
FIGURE 3 is a top plan view of the reader of FIG. 1 with the top cover removed.

A plurality of electrical terminals 48 are arranged on the supporting member 14 on the top side thereof, as illustrated in FIG. 3 and identified as the terminals BC1, R12, R11 . . . R9 in the same sequential order as the rows of the record member 12 are identified. Each of these electrical terminals mount a bifurcated, resilient, angular, conducting element, such as the element 50, and which elements are each suspended from their respective terminals to electrically engage the corresponding row conductor bar 32 when the tray 18 is in a reading position whereby a direct electrical circuit is defined between a row conductor bar and the corresponding row terminal. The row terminal may be electrically connected with the same connector and cable as provided for the column buses 40.

Figure 4:
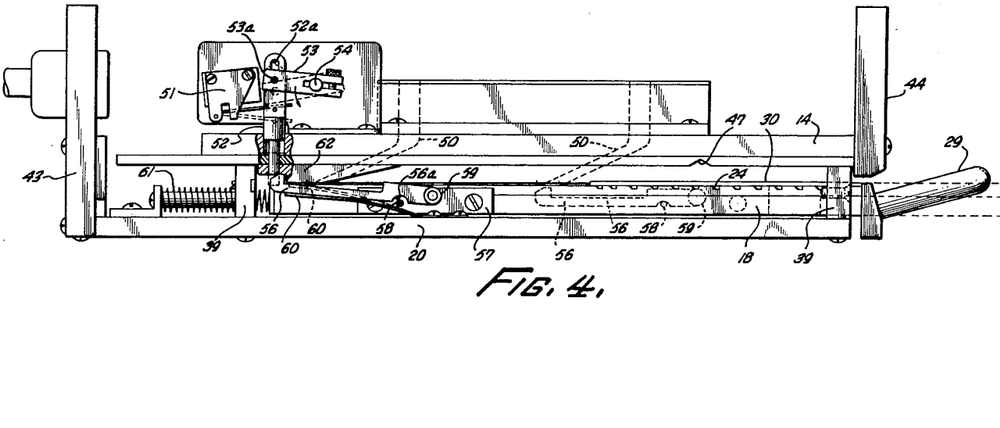
FIGURE 4 is a side elevational view of the reader as shown in FIG. 3.

The supporting member 14 further mounts a microswitch 51 at the opposite side thereof from the row terminals, or on the bottom side, as illustrated, at its inner extremity. The switch 51 is operated in response to a floating pin 52 loosely suspended from an actuating arm 53, in turn clamped to the shaft 54 of a rotary solenoid 55 mounted on member 14. The rotary solenoid 55 is also electrically connected by means of the cable to the data processing system. The actuating arm 53 has a bifurcated end and is clamped to the shaft of the solenoid 55 to be responsive thereto. The opposite end of the arm 53 mounts a pin 53ª slidable in a guide slot 52ª provided at one end of the floating pin 52. The opposite end of the floating pin 52 extends through the bottom face of the supporting member 14 by means of the aperture provided therefore and is freely slidable therein. When the floating pin 52 is freely suspended from the pin 53ª, the actuating arm for the microswitch 51 is arranged to maintain the switch in an open circuit condition and the arm assumes the position shown in dotted outline. Upon the floating pin 52 being raised to the position indicated in FIG. 4, the arm is raised to the switch closing position indicated.

The bottom face of the floating pin 52 engages a pawl 56 pivotally mounted to the left hand side of the tray 18 and movable therewith. This side of the tray 18 is provided with a stop pin 58 to engage the undercut portion 56ª of the pawl 56 to hold the pawl in a horizontal position. The stop pin 58 is mounted adjacent the pivot pin 59 for the pawl 56. The engagement of the floating pin 52 and the pawl 56 limit the downward travel of the floating pin 52. A flat, cantilevered spring 60 is secured to the base 20 and is inclined to engage the rear end of an inclined cam 62 suspended from the member 14. The spring 60 and cam 62 are defined to constrain the pawl 56 so as to engage the bottom end of the floating pin 52 as the tray 18 is positioned into a reading position within the housing 22. When the tray 18 is fully within the reader 10 the pawl 56 engages the back end of the cam 62, raises the pin 52, and locks the tray 18 into reading position.

A helical compression spring 61 is secured to the base 20 between the rear plate 43 and the spacer bar 39, extending through an aperture provided in the bar 39 into the path of the tray 18 to engage the rear thereof. The spring 61 is carried by a rod secured to the base 20 by means of a bracket. The spring 61 is of sufficient compressive strength to allow it to eject the tray 18 outwardly to a non-read position when the pawl 56 is released to indicate to the operator the non-read condition of the reader 10.

Figure 11:
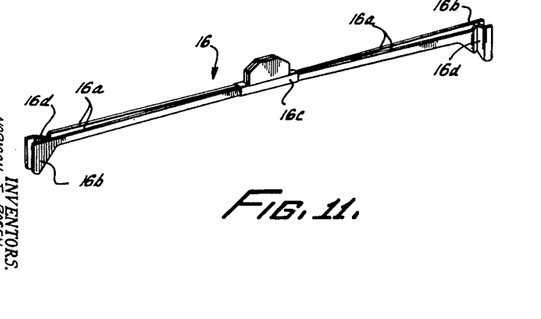
FIGURE 11 is a detached perspective view of the sensing elements for the reader of FIG. 1.

The sensing elements 16 are illustrated in FIG. 11 detached from the reader 10 and will now be examined in more detail. Each of the sensing elements 16 are of an identical construction and comprise a pair of flat, thin, elongated, electrical conducting elements 16ª, such as may be constructed from a beryllium copper punching. The outer ends of the elements 16ª are each provided with a sensing portion or finger 16ᵇ. The sensing fingers 16ᵇ are defined relative to the size of the perforations of the record member 12 to not only engage the perforations but to pass therethrough; see FIGS. 8 and 9. The elements 16ª are preferably constructed of a material that is of sufficient resiliency to allow a sensing finger 16ᵇ to electrically engage one of the row conductor bars 32 while under tension, and yet have sufficient stiffness to cause the sensing element 16 to be slidable when a sensing finger 16ᵇ engages a recorded perforation.

The pair of elements 16ª are secured together by means of a saddle 16ᶜ, which may be of one piece construction and may also be defined with a pair of sensing fingers extending in the opposite direction from the sensing fingers 16ᵇ. The saddle 16ᶜ is arranged to loosely constrain the center of the elements 16ª whereby the sensing fingers 16ᵇ for each element may be readily spaced apart a predetermined distance. The spacing is provided in this instance by producing a spacing channel 16ᵈ on one of the sensing fingers 16ᵇ and which channels have a depth defining the desired spacing between the sensing fingers. The distance between the adjacent sensing fingers 16ᵇ is defined to be related to the width of the recording channel or column on the record member 12 whereby each sensing finger is capable of separately engaging a perforation in the recording member 12 and separately providing the electrical current therethrough for indicating the presence of the perforation. This spacing is on the order of .040 inch when the standard IBM column width of approximately .056 inch is utilized.

It should be noted that the above-described dual construction of each sensing finger 16ᵇ not only provides dual contacts with each perforation on the record member 12 but also provides dual contacts at the row conductor bars 32. This sensing construction results in the contact between a record member and the sensing element to be always purely mechanical, since the electrical conducting sensing fingers are spaced from the perforation sensing fingers. Accordingly, the electrical contacts cannot be contaminated with foreign substances introduced into the reader 10 by means of the record members. The saddle arrangement of securing the sensing elements 16ª together also allows the entire sensing element to move to the required reading position even when only one of the perforation sensing fingers 16ᵇ engage a perforation. This construction, therefore, results in an inexpensive trouble-free operating, and easily maintained sensing element.

The function of the sensing element 16 is to provide the electrical connection between a row conductor bar 32 and a column bus 40 corresponding to the row and column in which a perforation is recorded on the record member 12. The length of the sensing element 16 is thereby defined whereby one pair of sensing fingers 16ᵇ engages a row groove 24 on the tray 18 while at the same time the sensing fingers at the opposite end engage the corresponding row conductor bar 32; that is, the row groove 24 and the row conductor bar 32 are representative of the same row on the record member 12. The distance between the saddle 16ᶜ and the sensing elements 16 corresponds to the distance between the securing notch 47 on the supporting member 14 and the conducting bus 45; that is, when the tray 18 is fully retracted from the reader 10 the outer sensing fingers 16ᵇ engage the conducting bus 40 while the saddle 16ᶜ is releasably secured by the V-shaped groove 47.

Figure 7:
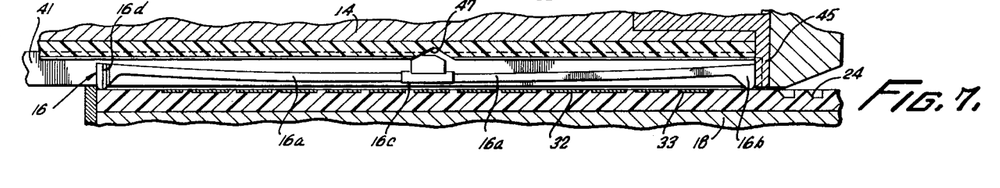
FIGURE 7 is a partial longitudinal, cross-sectional view of the receiving tray and the supporting member showing the sensing elements in the secured non-read position.

The sensing elements 16 are arranged to be carried by the supporting member 14 and are slidably mounted between a pair of guides 41 whereby the saddle portion 16ᶜ electrically engages the column buses 40. The space between the supporting member 14 and the tray 18 is reduced to place the sensing assemblies under continuous tension whereby they assume a bowed relationship such as shown in FIG. 7. The aforementioned spacing is of a depth whereby a continuous contact pressure is maintained at all three points of each sensing element 16, even when the sensing fingers 16ᵇ engage a row groove 24. The sensing elements 16 have sufficient stiffness to allow them to slidably leave the V-shaped securing grooves 47 when any one of the perforation sensing fingers 16ᵇ engage a perforation in the record member 12 to cause them to slide between their guides 41 and in continuous electrical contact with the column buses 40 in response to the sliding movement of the tray 18.

With the above structure in mind, the operation of the reader 10 may now be described. Assuming the tray 18 is arranged in a non-read position, slightly withdrawn, it may be fully extended to the position shown in FIG. 1 to allow the record member 12 be positioned thereon. The record member 12 is held between the card guide 27 and the barrier 30, with the "9" edge of the record member 12 pushed against the raised shoulder 29ª of the tray 18. The top edge, "12" edge, of the record member 12 will now drop inside the raised front edge of the tray 18. With the record member 12 correctly positioned on the tray 18, it may be pushed into the reader 10 by means of a handle 29. The tray 18 is pushed into the reader 10 to assume a reading position whereby the pawl 56 engages and latches onto the cam 62, locking the tray 18 in a reading position. At this time the floating pin 52 is elevated and operates the switch 51. The operation of the switch 51 provides an electrical signal to the data processing system indicating that the tray 18 is in a position to be read. It should also be noted that the spring 61 is compressed by the tray 18 and is maintained in this compressed condition as a result of the latching of the tray 18 into the reading position.

Figure 9:
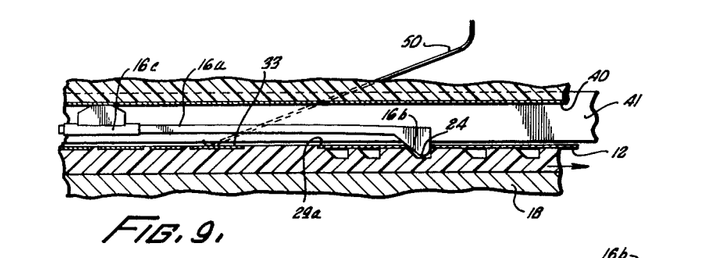
FIGURE 9 is a partial sectional view taken along the line 9—9 of FIG. 8.
Figure 10:
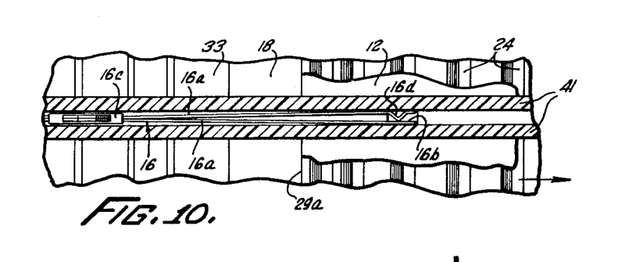
FIGURE 10 is a partial sectional view taken along the line 10—10 of FIG. 8.

During the travel of the tray 18 into the reader 10, each of the sensing elements 16 engage the record member 12 at the perforation sensing fingers whereby they successively sense each row beginning with row nine through row twelve. When any one sensing element 16 engages a perforation in the record member 12 the sensing element 16 that is so engaged has its perforation sensing finger extended through the record member 12 as shown in FIG. 9 to engage the corresponding groove 24. The interengagement of the perforation sensing fingers and a row groove 24, and the continued travel of the tray 18 function to release this sensing element 16 from the securing groove 47 whereby it is allowed to slide along its column bus 40 until the tray 18 is latched. When the tray 18 is latched in a reading position, the innermost, or row bar, sensing fingers will be arranged in electrical engagement with the corresponding row conductor bar 32 whereby an electrical circuit will be completed between the terminals 42 by means of the individual column bus 40, the sensing element 16, the row conductor bar 32, and the element 50 corresponding to the row terminal.

If, during the travel of the tray 18, the sensing element 16 for any one column does not engage a perforation in a record member 12, this sensing element will not be released from the groove 47 but will be retained in its initial non-read position whereby the outer sensing fingers will engage the blank column conducting bus 45, while the inner sensing fingers will be in electrical contact with the row conducting bar 33. At this time an electrical circuit path is provided between the conducting bus 45, the row conducting bar 33, and to a corresponding element 50 to indicate the sensed column is blank, and has no perforations recorded therein. If more than one blank column is detected on the card, only a single indication that a blank column is present will be provided by this arrangement.

After the tray 18 is positioned for reading and the reading signal is indicated by the operation of the switch 51, the data processing system may interrogate the reader 10. The data processing system may then interrogate the reader 10, row-by-row, to digitally interpret the signals provided by the connections between the row and column buses. Upon completion of its interrogation, the data processor will provide a pulse to the rotary solenoid 55 to cause the floating pin 52 to release the pawl 56. When the pawl 56 is released the compression spring 61 automatically ejects the tray to a partially open position. The operator may then expose the tray to its fully extended position and remove the record member 12 in preparation for the next reading operation. It should be noted that in lieu of the pulsing of the solenoid 55 to release the tray 18, the reader 10 is provided with a removable button 62 on the housing 12 to allow access to the pawl 56 to manually release it and thereby eject the tray 18.

Assuming that on the next reading operation, no record member 12 is on the tray or a record member is utilized thereon of narrower columnar capacity than the tray, in this instance, less than the required number of twelve columns, then, under either of these latter conditions, the tray 18 will still assume its correct reading position, but each of the sensing elements 16 which do not engage a record member will immediately engage the groove 26 and the corresponding sensing fingers will engage the insulative area of the tray beyond the "9" row conductive bar 32. Since these sensing elements 16, at this time, are connected to insulating portions, no electrical signal will be provided to the data processing system and the lack of an electrical signal will indicate that no card or a short card is in the reader 10.

Figure 12:
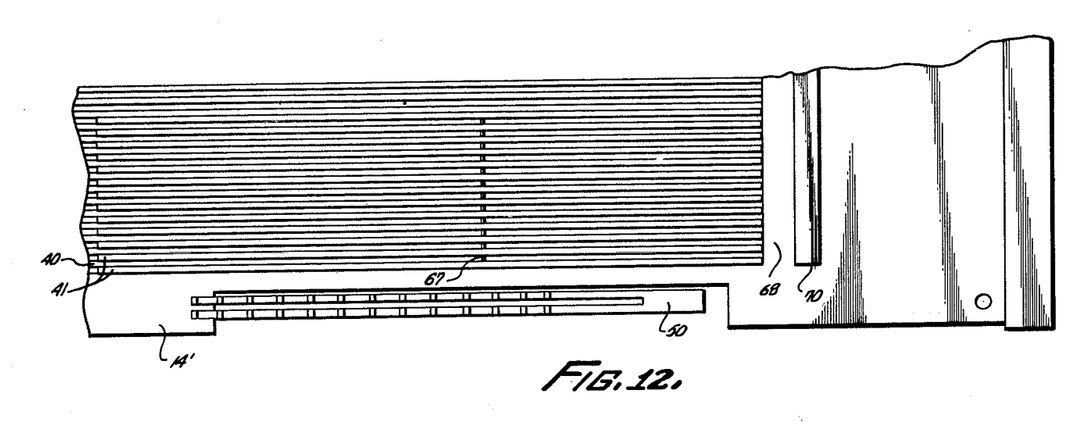
FIGURE 12 is a partial bottom plan view of a supporting member having a modified structure for the non-read position.

Now referring to FIGS. 12 and 13, a modified structure for the non-read position or blank column detection for the reader 10 will be described. The general structure of the reader 10 is identical to the above-described structure and operation and the modifications merely relate to the construction of the sensing elements 16 and the cooperating structure of the supporting member 14' and the tray 18 to releasably retain the sensing elements in the non-read position.

The modified sensing element 16 includes a lifting camming surface 16e defined intermediate the sensing finger 16b and the saddle 16c shown arranged adjacent each of the fingers 16b and spaced inwardly therefrom towards the saddle member 16c. The saddle member 16c is modified merely to eliminate the chamber whereby the top surface of the pair of sensing fingers presents a substantially planer surface to the column buses 40, as shown. The camming surface 16e is defined for cooperation with an electrical conducting lifting wire 67 carried by the guides 41 whereby the interengagement of the lifting wire 67 and the camming surface 16e causes the adjacent sensing fingers 16b to be lifted upwardly and out of engagement with the tray 18 and, in particular, the row conductor bars 32. The provision of the camming surface 16e for each of the fingers 16b rather than for just the row bar sensing fingers is merely for manufacturing purposes rather than functional.

The supporting member 14' differs from the supporting member 14 in the elimination of the V-shaped groove 47 and the elimination of the blank column conductor bus 45. The column buses 40 are defined on the supporting member 14' in the same fashion as described hereinabove and their outer ends terminate adjacent an insulating strip 68 located in the same general area as occupied by the V-shaped groove 47. Opposite the terminal ends of the column buses 40 and arranged on the opposite side of the insulating strip 68 there is provided a common blank column bus 70 running transversely of the supporting member 14'. The location of the saddle 16c for the sensing elements 16 and the strip 68 are dimensioned relative to one another whereby the sensing fingers of the saddle 16c do not engage the outer ends of the column buses 40 but do engage the blank column bus 70 when the tray 18 is in a non-read position. It should be recognized that the extension of the column buses 40 are not shown in FIG. 12 and could have been eliminated in the previous embodiment as well since they serve no useful function.

The conductive lifting wire 67 is mounted in the guides 41 by means of a transverse aperture running through each of the guides and spaced inwardly from the insulating strip 68 a preselected distance to allow the wires to cooperate with the camming surface 16e to effect the desired lifting action. In order to obtain the desired electrical indication of the non-read position or blank column detection for the reader, the blank column bus 70 is electrically connected to a separate bifurcated element 50 (not shown) to define a complete electrical circuit with the stationary lifting wire 67. The circuit extends from the lifting wire 67, the forced contact between the wire 67 and the sensing elements 16 and the blank column bus 70 to the connected bifurcated element 50.

The receiving tray 18, when it is provided with a blank column conducting bar 33, will also be modified for the present non-read structure by the elimination of the blank column conducting bar 33. As indicated hereinabove, the function of this column conducting bar 33 is served by the lifting wire 67.

Figure 13:
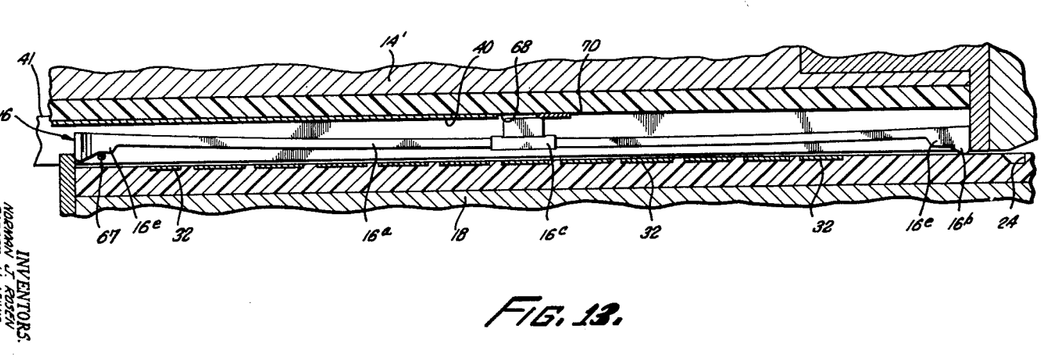
FIGURE 13 is a partial longitudinal, cross-sectional view of the receiving tray and the supporting member of FIG. 12 showing a modified sensing element secured in the non-read position.

The non-read position of the modified sensing element 16 is shown in FIG. 13 wherein the inner or row bus sensing finger 16b is held out of physical contact with the top surface of the receiving tray 18 by means of the interengagement of cam surface 16e and the lifting wire 67. This arrangement will then provide the electrical indication that the reader 10 is in the non-read position. When the receiving tray 18 is slidably moved into the reader 10 to effect a reading operation, the outer or the perforation sensing fingers 16b upon engagement with a perforation in the record member 12 will force the sensing element 16 to move inwardly and to disengage the camming surface 16e from the lifting wire 67 to allow the sensing fingers 16b to drop into engagement with the top surface of the receiving tray 18 whereby it may be positioned on the correct row conductor bar 32. At this same time the saddle 16c will travel away from the insulating strip 68 and engage the corresponding column bus 40. The continual travel of the sensing element 16, after disengagement with the lifting wire 67, will not provide an electrical contact between the sensing element 16 and the wire 67 since the vertical position of the wire 67 is defined to maintain a spaced relationship with the sensing element 16 except at the camming surface 16e.

When the sensing element 16 senses the absence of a card or a card having a columnar capacity less than the columnar capacity of the tray 18, the perforation sensing fingers 16b engage the groove 26 as described hereinabove.

It should be noted that the above-described modified non-read structure provides an increased force on the perforation sensing fingers 16b relative to the force produced when the V-shaped groove 67 is utilized. This slight increase in force is desirable and is to be contrasted with an undesirable reduction in sensing finger force occurring as a result of the coaction of the saddle 16c and the V-shaped groove 47. The modified structure has been found to reduce the manufacturing costs and to extend the life of the record reader 10 by eliminating the wear concentration of the V-grove 47. The V-groove arrangement is satisfactory for most reader applications.

Figure 14:
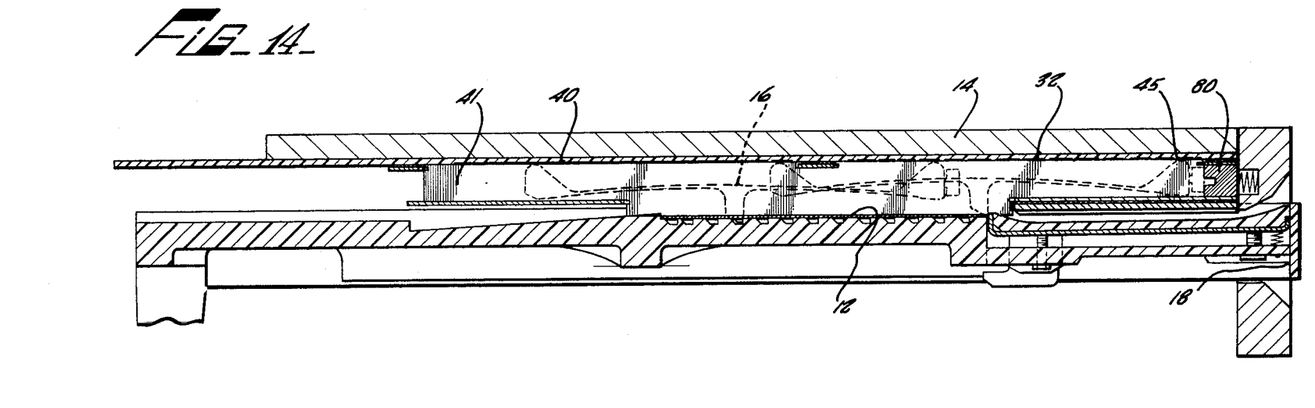
FIGURE 14 is a partial longitudinal, cross-sectional view of a modified record reader showing the record card receiving tray in a reading position and showing a pair of modified sensing elements in dotted outline arranged in a perforation reading position and a blank column reading position.
Figure 15:
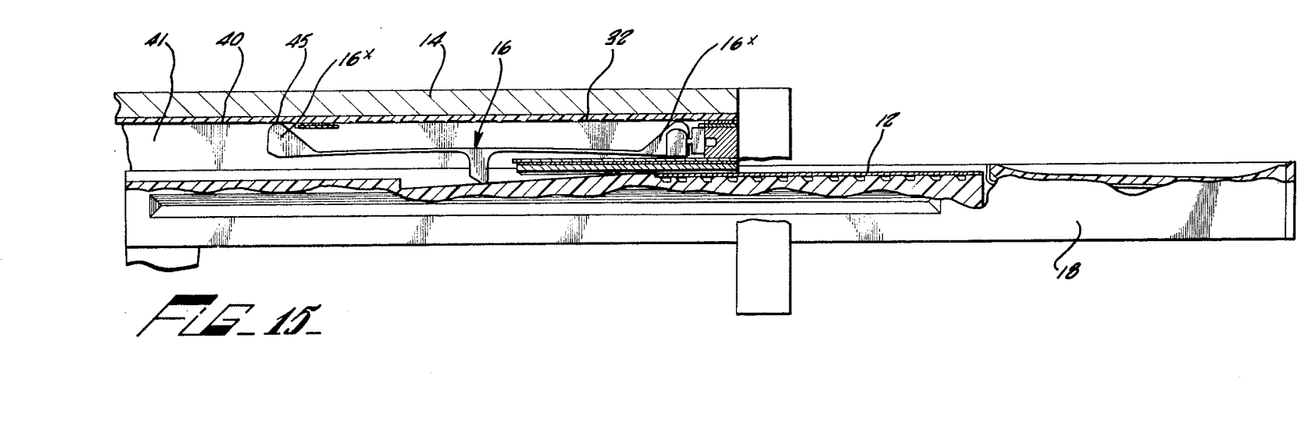
FIGURE 15 is a partial longitudinal, cross-sectional view of the record reader of FIG. 14 with the card receiving tray in a normal non-read position and with a modified sensing element shown in its normal non-read position.

Now referring to FIGS. 14 through 19 a modified sensing element will be described. As mentioned hereinabove, the sensing element 16 provides the electrical connection between a row conductor bar 32 and a column bus 40 corresponding to the row and column in which a perforation is recorded on the record member 12. In this particular embodiment of the record reader 10 the row conductor bars 32 are rearranged whereby they are located in the same plane as the column buses 40. Specifically, the row conductor bars 32 are removed from the record card receiving tray 18 and are defined as a single printed circuit board with both the row conductor bars 32 and the column buses 40 arranged thereon, as best seen in FIGS. 14 and 15. The record card reader 10 is further modified through the provision of a magnetic detent arrangement comprising a permanent magnet channel 80 and individual magnetic armatures 81 for each sensing element 16. This magnetic detent arrangement provides more positive retention of the sensing elements 16 in their non-read positions.

It should be noted that a more detailed description of the modified record reader 10 may be had by reference to our co-pending application entitled Record Reader, bearing Serial No. 198,685 and filed on May 24, 1962, and assigned to the same assignee as the present application. Suffice it to say for the purposes of the present invention that the column buses 40 and the row conductor bars 32 are defined on the same printed circuit board whereby the electrical sensing portions of the sensing element 16 form a cross-connection between a column bus 40 and a row conductor bar 32 in accordance with the physical location of the perforation on the record member 12. The supporting structure of the modified record reader 10 for the sensing elements 16 is constructed in the same fashion whereby the sensing elements 16 are constrained between the insulative guides 41 and are placed under tension to provide the electrical contact pressure as well as perforation searching pressure, as in the previous embodiments. The present sensing element 16, however, is retained in its non-read or "no data" position by means of a channel type permanent magnet 80 cooperating with armatures 81 defined for each of the sensing elements 16. The permanent magnets 80 are arranged at the forward portion of the record reader 10 proper and are mounted in a horizontal position on the supporting member 14, as best seen in FIGS. 14 and 15.

Figures 16, 19:
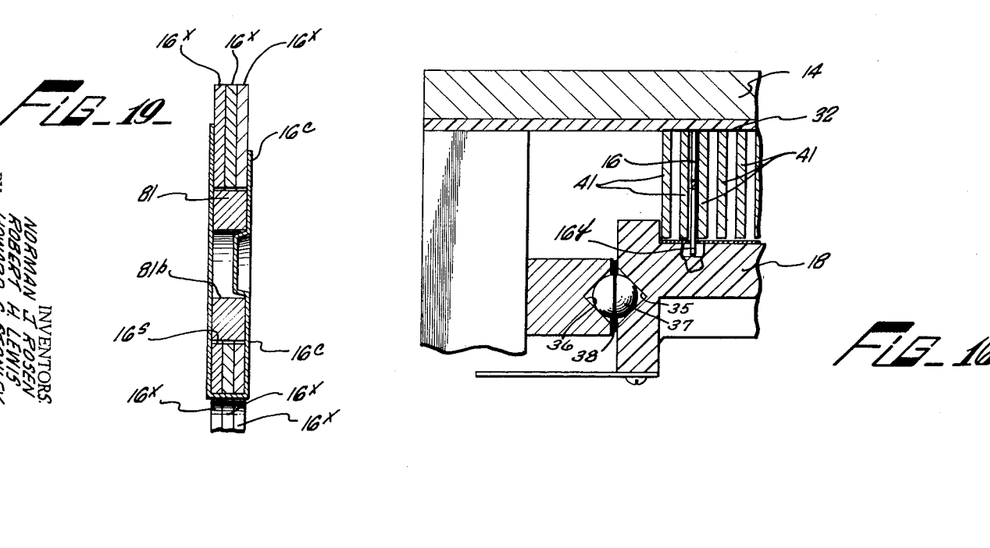
FIGURE 16 is a partial cross-sectional view of the supporting structure for the sensing elements for the record reader of FIGS. 14 and 15.
FIGURE 19 is a cross-sectional view of the securing means for the sensing element of FIGS. 17 and 18 taken along the line 19—19 thereof.
Figures 17, 18:
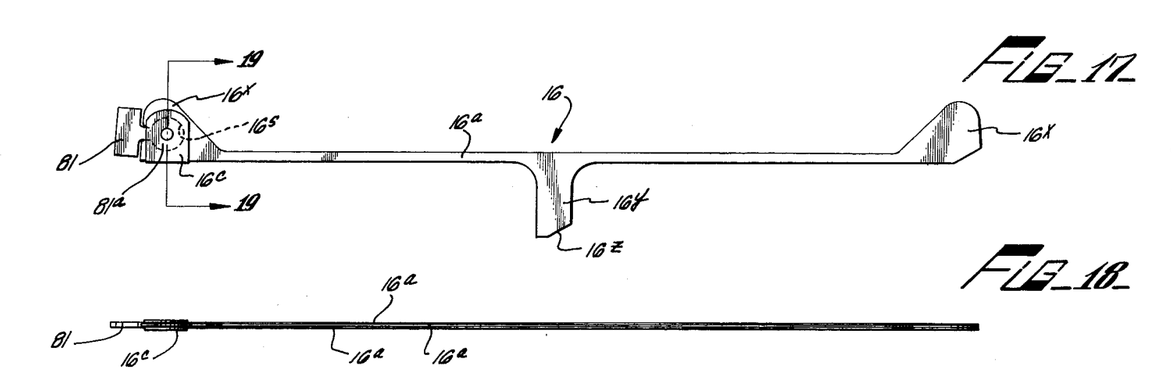
FIGURE 17 is a side elevational view of the modified sensing element for use in the record reader of FIGS. 14–16.
FIGURE 18 is a top view of the sensing element of FIG. 17.

Now referring to FIGS. 16 through 18 in particular, a detailed examination of the modified sensing element 16 will better disclose the features of this modified sensing element. It should be noted that the sensing elements 16 are stamped out of the same material as the above-described embodiments and comprise a plurality of flat, thin, elongated, electrical conducting fingers $16^a$ such as may be constructed from a beryllium copper. Specifically, the use of beryllium copper allows the sensing fingers to have sufficient resiliency to allow the sensing element to engage one of the row conductor bars and column buses while under tension and yet have sufficient stiffness to allow the sensing fingers 16 to be independently slidable when a sensing finger engages a recorded perforation. In this particular embodiment the redundant characteristic of a sensing element is provided through the use of three identical sensing fingers $16^a$ that are loosely constrained together by means of a saddle $16^c$ constructed of the same material as the sensing finger proper. Each sensing finger $16^a$ is defined with a pair of electrical sensing portions arranged adjacent each end and are identified as $16^x$. Each electrical sensing portion $16^x$ extends outwardly from the body proper of the sensing finger in the same direction while a perforation sensing portion $16^y$, which is substantially centrally arranged between the electrical sensing portions $16^x$, extends outwardly from the sensing finger proper in the opposite direction. The perforation sensing portion $16^y$ is generally defined in the same fashion as in the previous embodiments and includes a tapered portion $16^z$ defined to allow the sensing portion $16^y$ to be readily released from a sensed perforation upon completion of the reading operation.

One of the electrical sensing portions $16^x$ is defined with a socket portion $16^s$ to receive a ball $81^a$ defined integrally with the armature 81. As will be evident from examining FIG. 19, it will be seen that the armature 81 is arranged with its ball portion $81^a$ fitted into the socket $16^s$ of the sensing portion $16^x$ and that each of the sensing fingers $16^a$ are secured together at this sensing portion by means of the saddle $16^c$. The saddle $16^c$ is secured together by means of a dimple portion extending through the socket of the sensing portion $16^x$ as well as a central opening $81^b$ defined for the armature ball $81^a$. It will be recognized that the use of the permanent magnet 80 for securing the sensing element 16 in a non-read position requires that the armature 81 be constructed of a magnetic material. Furthermore, the armature 81 is defined with a magnetic surface to cooperate with the pole faces of the permanent magnet 80 to positively secure the armature 81 thereto and retain each of the sensing elements 16 in this position during the searching operation and to release the sensing element 16 when the sensing portion $16^y$ locates a recorded perforation. The magnetic pull or strength of the magnet 80 is proportioned to allow the force applied to the sensing elements 16 by means of the motion of the tray 18 to overcome the magnetic pull on the armature 81 whereby it is released to travel with the record card receiving tray 18 to provide the correct cross-connection between the column buses 40 and the row conductor bars 32. It will be recognized that the arrangement of the record reader 10 shown in FIG. 15 with the receiving tray open is such that the sensing elements 16 are positioned in the non-read position.

It should now be evident that the function of the modified sensing elements 16 is the same as in the above-described embodiments and operates under the same general conditions. However, in the present embodiment the searching force is doubled due to the location of the perforation sensing portions $16^y$ intermediate the electrical sensing portions $16^x$ and to which latter portions a force is applied to the sensing fingers for placing them under tension. In addition, the construction of the saddle $16^c$ is such as to allow freedom of the individual sensing fingers to provide independent, parallel electrical contacts yet allowing the entire sensing element 16 to be driven by only one sensing finger that is located in a card perforation without providing for additional spacing as in the previous embodiments. This permits effective card reading even though the card perforations are not perfectly aligned with the sensing elements 16.

It should now be evident that the disclosed invention provides an improved sensing element for searching perforated record members and which sensing elements comprise the entire cross-connecting element as well as perforation sensing element all in a unitary, simple punching. In addition, the sensing fingers are placed under tension to provide the electrical contact pressure between the cross-connected electrical conductors as well as utilizing this same pressure as a searching force on the perforation sensing portion of the sensing element. The plurality of sensing fingers comprising a sensing element are constructed so that they can be bifurcated, trifurcated, et cetera for providing the required redundancy in perforation sensing as well as in effecting reliable electrical contact.

What is claimed is:

1. A sensing element for imperforate record members and the like including an elongated, resilient element having a substantially central sensing portion extending outwardly therefrom and a sensing portion at opposite ends thereof and extending outwardly therefrom in the opposite direction from the central sensing portion.

2. A perforated record member reading element comprising a pair of flat, elongated, resilient electrical conducting elements defined with at least a portion at one end for engaging a perforation in a record member to be read, and an electrically conducting securing member arranged substantially centrally of each of said conducting elements to hold the pair together adjacent their centers, said pair being spaced apart a predetermined distance at their opposite ends.

3. An element for reading perforated record members and adapted to slide along a recording channel of a record member to be read, including, in combination, a pair of elongated electrical conducting elements defined with a protruding sensing portion at opposite ends thereof, at least one of said ends is defined relative to the size of the recorded perforations of a record member to be releasably retained therein, and an electrically conducting securing member arranged substantially centrally of each of said conducting elements to loosely constrain same, the thus secured elements being constructed with their sensing portions spaced apart a distance related to the width of the recording channel on the record member whereby each sensing portion is capable of separately engaging a perforation in the recording channel and providing an electrical indication thereof, and the electrical conducting elements being further characterized as being of sufficient resilience to be placed under tension to provide a forced electrical contact and yet of sufficient stiffness to be slidable in response to the engagement with a perforation in a recording channel while under tension.

4. An element for reading perforated record members as defined in claim 3 wherein each of said elements are constructed of beryllium copper and the securing member is similarly defined with its opposite ends extending from a side opposite from the sensing ends and spaced apart a small preselected distance whereby each end serves as a sensing finger.

5. An element for reading perforated record members and adapted to slide along a recording channel of a record member to be read, including, in combination, a pair of elongated electrical conducting elements defined with a protruding sensing portion at opposite ends thereof, the sensing portion including a camming surface adjacent at least one of said ends arranged inwardly thereof for causing a lifting of said one end upon engaging a lifting element and with at least the other one of said ends defined relative to the size of the recorded perforations of a record member to be releasably retained therein, and an electrically conducting securing member arranged substantially centrally of each of said conducting elements to loosely constrain same, the thus secured elements being constructed with their sensing portions spaced apart a distance related to the width of the recording channel on the record member whereby each sensing portion is capable of separately engaging a perforation in the recording channel and providing an electrical indication thereof, and the electrical conducting elements being further characterized as being of sufficient resilience to be placed under tension to provide a forced electrical contact and yet of sufficient stiffness to slidably release said camming surface and to continue to be slidable in response to the engagement with a perforation in a recording channel while under tension.

6. A sensing element comprising a plurality of elongated, resilient conducting fingers secured together defining a substantially central sensing portion extending outwardly therefrom and a sensing portion adjacent opposite ends thereof, one of said sensing portions functioning to engage a perforation in a record member upon the production of relative movement between the sensing element and the record member while the other sensing portions function as an electrical cross connection between a pair of conductors for electrically indicating the physical location of the perforation on the record member.

7. A sensing element for searching a record member having perforations in preselected rows and columns and providing an electrical indication of the row and column of the perforation upon location of same, said sensing element being defined with a substantially central perforation sensing portion extending outwardly therefrom and a pair of electrical sensing portions arranged adjacent the opposite ends of the element and extending outwardly therefrom in a direction opposite from the central sensing portion, said sensing element being further characterized as being of sufficient stiffness to be independently capable of a sliding searching movement upon the production of relative movement between the sensing element and a record member whereby the central sensing portion searches for a perforation in a particular card column while a force is applied to both of the electrical sensing portions to place the element under tension and thereby to the perforation sensing portion to cause said perforation sensing portion to positively position itself in a perforation upon locating same and to travel with the record member whereby the electrical sensing portions function as a cross connection for electrically indicating the row and column of the located record member perforation.

8. A sensing element for searching a record member having perforations in preselected rows and columns and providing an electrical indication of the row and column of the perforation upon location of same, said sensing element comprising a plurality of elongated, resilient conducting fingers secured together, each of said sensing fingers being defined with a substantially central perforation sensing portion extending outwardly therefrom and a pair of electrical sensing portions arranged adjacent the opposite ends of the fingers and extending outwardly therefrom in a direction opposite from the central perforation sensing portion, said sensing fingers being further characterized as being of sufficient stiffness to be independently capable of a sliding searching movement upon the production of relative movement between the sensing element and a record member whereby the central sensing portion searches for a perforation in a particular card column while a force is applied to both of the electrical sensing portions to place the element under tension and thereby to the perforation sensing portion to cause said perforation sensing portion to positively position itself in a perforation upon locating same and to travel with the record member whereby the electrical sensing portions function as a cross connection for electrically indicating the row and column of the located record member perforation.

9. A sensing element of the type defined in claim 8 including a magnetic member carried by one of the electrical sensing portions.

10. A sensing element of the type defined in claim 8 wherein three sensing fingers are secured together and each sensing finger is constructed of beryllium copper.

References Cited in the file of this patent

UNITED STATES PATENTS

| | | |
|---|---|---|
| 2,508,603 | Gollwitzer | May 23, 1950 |
| 2,869,780 | Radke | Jan. 20, 1959 |
| 2,892,907 | Richmond | June 30, 1959 |
| 3,066,863 | Wilson | Dec. 4, 1962 |

OTHER REFERENCES

"Sensing Apparatus" (Klauda), published July 1961, in IBM Technical Disclosure Bulletin; Vol. 4; No. 2; p. 17.

"Card Reading Control Mechanism" (Porterfield and Rock), published August 1961, in IBM Technical Disclosure Bulletin; Vol. 4; No. 3; p. 17.